US005531546A

United States Patent [19]

Herdlicka et al.

[11] Patent Number: 5,531,546
[45] Date of Patent: Jul. 2, 1996

[54] MORTAR COMPOSITION

[75] Inventors: Alwin Herdlicka, Bad Nauheim; Ludwig Gebauer, Olching; Gabriele Grundmann, Landsberg, all of Germany

[73] Assignee: Hilti Aktiengesellschaft, Schaan, Liechtenstein

[21] Appl. No.: 425,691

[22] Filed: Apr. 19, 1995

Related U.S. Application Data

[63] Continuation of Ser. No. 340,964, Nov. 17, 1994, abandoned, which is a continuation of Ser. No. 177,653, Jan. 3, 1994, abandoned, which is a continuation of Ser. No. 32,563, Mar. 17, 1993, abandoned, which is a continuation of Ser. No. 873,670, Apr. 23, 1992, abandoned, which is a continuation of Ser. No. 623,237, Dec. 4, 1990, abandoned.

[30] Foreign Application Priority Data

Dec. 6, 1989 [DE] Germany .......................... 39 40 309.2

[51] Int. Cl.$^6$ ........................... E21D 20/00; E21D 21/00; C08F 26/02; C08J 3/00

[52] U.S. Cl. ..................... 405/259.5; 405/259.6; 524/199; 524/219; 524/590; 524/555; 525/455; 525/920; 526/301; 528/49; 528/84

[58] Field of Search ..................... 524/199, 219, 524/590, 555; 528/49, 84; 526/301; 525/455, 920; 405/259.5, 259.6

[56] References Cited

U.S. PATENT DOCUMENTS

| | | | |
|---|---|---|---|
| 4,452,964 | 6/1984 | Saracsan | 528/50 |
| 4,477,533 | 10/1984 | Phillips | 428/458 |
| 4,729,696 | 3/1988 | Goto et al. | 525/531 |

*Primary Examiner*—Paul R. Michl
*Assistant Examiner*—Patrick Niland
*Attorney, Agent, or Firm*—Anderson Kill Olick & Oshinsky

[57] ABSTRACT

For fastening anchoring means, such as anchor rods, in solid accommodating materials without expansion pressure, mortar compositions are used, which consist of a hardener and a resin. To improve the strength properties, vinyl ester urethane resin is employed, which optionally can be accelerated.

2 Claims, No Drawings

MORTAR COMPOSITION

This is a continuation of U.S. patent application Ser. No. 08/340,964 filed Nov. 17, 1994 abandoned, which is a continuation of U.S. patent application Ser. No. 08/177,653 filed Jan. 3, 1994 abandoned, which is a continuation of U.S. patent application Ser. No. 08/032,563 filed Mar. 17, 1993 abandoned, which is a continuation of U.S. patent application Ser. No. 07/873,670 filed Apr. 23, 1992 abandoned, which itself is a continuation of U.S. patent application Ser. No. 07/623,237 filed Dec. 4, 1990, now abandoned.

BACKGROUND INFORMATION AND PRIOR ART

It is well known that compositions, containing hardenable, unsaturated polyesters, epoxy acrylates, urethane-forming isocyanates and/or epoxides can be used for fastening anchor rods in boreholes without expansion pressure. For this purpose, the compositions, together, with the hardener, are introduced into the borehole. To accomplish this, the compositions, mixed and measured out, can also be applied in a borehole by means of cartridges, squeeze-out devices and static mixers. It is also possible to fabricate the hardenable component and the hardener, that is, the respective starting components, in two compartments of a cartridge. By introducing the anchor with rotation into the borehole containing the cartridge, the compartments are destroyed and the two components are mixed.

The strength level of the fastening finally attained depends, above all, on the adhesive system and the degree of filling.

Unsaturated polyester resin systems, based on o- and/or isophthalic acid, maleic acid or fumaric acid as dicarboxylic acid and dialcohols have certain weaknesses with respect to the more stringent requirements for fastenings. The previous limits of the systems are the deformability when subjected to the action of heat, the ageing—especially when acted upon by moisture, temperature changes and alkalinity—strong shrinkage, deficient adhesion and inhibition of surface curing by oxygen. The epoxy acrylates, condensates of methacrylic acid and/or acrylic acid with epoxide compounds based on bisphenol A, bisphenol F or novolaks, have a greater resistance to the effects of the climate and especially to those of alkalinity, and improved adhesion properties with respect to unsaturated polyester resins. However, the three dimensional cross linking of the epoxy acrylates is less. Shrinkage and inhibition of surface curing due to oxygen are comparable with those of unsaturated polyester resins. Polyurethanes have very good adhesion properties, but, if their pot life is adequate, then their curing time is significantly longer than that of polyester resins and epoxy acrylates, which are cured with the help of free radical initiators. They react sensitively with side reactions in the presence of moisture because of the competing reaction with water, as a result of which disorders in the structure (foam structure) result, which weaken the bond. Finally, epoxide resins also have a very long curing time and cannot be used at temperatures below +5° C. Their curing systems for low temperatures are moisture-sensitive. Their adhesion properties at room temperature are very good.

OBJECT OF THE INVENTION

It is an object of the invention to provide a hardenable composition such as a mortar composition for fastening anchorages. This mortar composition is to be free of the disadvantages of the known mortar compositions and nevertheless should result in fastenings of outstanding permanence and strength.

SUMMARY OF THE INVENTION

This objective is accomplished with mortar compositions, which contain, as adhesive, vinyl ester urethanes that can be cured by free radical means.

Vinyl ester urethanes, frequently also referred to as vinyl ester urethane resins, are linear or branched polyurethanes, which are liquids or are soluble in solvents such as reactive diluents and contain acrylate and/or methacrylate groups. Compounds of this type and their synthesis are known (see German Offenlegungsschrift 35 36 246, EP 0 123 081 and EP 0 002 129 and the literature referred to therein). Vinyl ester urethane resins can be cross linked or cured through free radical polymerization or copolymerization with the reactive diluent(s).

The vinyl ester urethane resins can be synthesized, for example, by the reaction of difunctional and/or higher functional isocyanates with suitable acrylic compounds, hydroxyl compounds, which contain at least two hydroxyl groups, being optionally also used for the reaction.

As isocyanates, aliphatic (cyclic or linear) and/or aromatic difunctional or higher functional isocyanates or prepolymers can be used. The use of such compounds serves to increase the cross linking capability and, with that, to improve the adhesion properties. Particularly preferred are toluylene diisocyanate (TDI) and diisocyanatodiphenylmethane (MDI) to increase the chain stiffening, and hexane diisocyanate (HDI) and isophorone diisocyanate (IPDI), which improve the flexibility.

As acrylic compounds, acrylic acid and acrylic acids substituted at the hydrocarbon group, such as methacrylic acid, hydroxyl group-containing esters of acrylic acid or methacrylic acid with multihydric alcohols, such as pentaerythritol triacrylate, glycerol diacrylate, trimethylolpropane diacrylate and neopentylglycol monoacrylate are suitable. Hydroxyalkyl esters of acrylic or methacrylic acid, such as hydroxyethyl acrylate, hydroxypropyl acrylate, polyoxyethylene acrylate and polyoxypropylene acrylate are preferred, particularly since such compounds sterically hinder the saponification reaction.

Suitable as hydroxyl compounds that can be used are dihydric or multihydric alcohols, for example, products derived from ethylene oxide or propylene oxide, such as ethylene glycol, diethylene glycol, triethylene glycol, propylene glycol, dipropylene glycol, other diols such as 1,4-butanediol, 1,6-hexanediol, neopentyl glycol, diethanolamine, bisphenol A or bisphenol F or their ethoxylation and/or hydrogenation or halogenation products, polyhydric alcohols, such as glycerin, trimethylolpropane, hexanetriol and pentaerythritol, hydroxyl group-containing polyethers, such as oligomeric aliphatic or aromatic oxirans and/or higher cyclic ethers, such as ethylene oxide, propylene oxide, styrene oxide and furan, polyethers, which contain aromatic structures in the main chain, such as bisphenol A and bisphenol F, hydroxyl group-containing polyesters based on the aforementioned alcohols or polyethers and dicarboxylic acids or their anhydrides, such as adipic acid, phthalic acid, tetrahydrophthalic acid, hexahydrophthalic acid, "Het" acid, maleic acid, fumaric acid, itaconic acid, sebacic acid, etc. Particularly preferred are hydroxyl compounds with aromatic structure units to stiffen the chain or increase the "WFB" of the resin, hydroxyl compounds, which contain unsaturated structure units, such as fumaric acid, to increase the cross linking density, branched or star-shaped hydroxyl compounds, particularly trihydric or polyhydric alcohols and/or polyethers or polyesters, which contain their structure units, branched or star-shaped urethane acrylates to achieve a low viscosity of the resins or of their solutions in reactive diluents and a higher reactivity and cross linking density.

Aside from or instead of the homopolymerization, the vinyl ester urethane resins can also react with reactive diluents contained in the mortar compositions. As reactive diluents, all olefinically unsaturated compounds suitable for this purpose, particularly compounds containing vinyl groups and acrylic groups, such as monostyrene, divinylbenzene, methyl methacrylate, iso-propyl methacrylate, iso-butyl methacrylate, hexanediol diacrylate, tetraethylene glycol diacrylate, trimethylolpropane triacrylate, etc., can be used.

The resins or resin solutions can be pre-accelerated with accelerators, similar to those customary for cold-curing unsaturated polyester resins.

Such accelerators are, for example, tertiary aromatic amines, such as dimethylaniline, diethylaniline, dimethyl-p-toluidine, heavymetal salts, such as carboxylic acid salts of transition metals, such as cobalt octoate, cobalt naphthenate or organic vanadium salts. Combinations of the aforementioned accelerators are also advantageous, for example, the simultaneous use of cobalt and amine accelerators. The accelerators are added to the resin solutions either in pure form as 1 to 10% solutions in styrene, other reactive diluents or plasticizers such as esters of phthalic or sebacic acid. The concentration of pure accelerators is 0.03 to 0.5% by weight, based on the resin solution.

For the curing, the mortar compositions, which contain the vinyl ester urethane, are treated with free radical curing agents and mixed intimately. This can be accomplished, for example, by stirring the component containing the vinyl ester urethane resin with the hardener or by means of static mixers or, as described at the beginning, by the destruction of the 2-compartment cartridge. Organic peroxides, such as diacyl peroxides, for example, dibenzoyl peroxide and bis(4-chlorobenzoyl) peroxide, ketone peroxides, such as methyl ethyl ketone peroxide and cyclohexanone peroxide, as well as alkyl peresters, such as t-butyl perbenzoate, function as hardener components. The initiators can be used in pure form, such as TBPB, or stabilized, for example, with plaster, chalk, pyrogenic silica, phthalate, chloroparaffin or water, as a powder, as an emulsion or as a paste. In the state in which they can be measured out or used, the mortar compositions contain the hardener generally in an amount of 0.2 to 5 and preferably of 0.5 to 4% by weight, based on the total composition.

As a further component, the mortar compositions can contain fillers such as quartz, glass, corundum, china, earthenware, aluminum hydroxide, heavy spar (barium sulfate), chalk or polymers, which are mixed either into the resin solution and/or the hardener (initiator) in the form of sands, powders or special molded articles (cylinders, spheres, platelets).

When packaged as cartridges, the wall material of the cartridge can also be regarded as portion of the filler after the settling and mixing process.

Finally, yet another object of the invention is the use of vinyl ester urethane resins, which can be cured by free radical means, in mortar compositions for fastening anchor rods in boreholes.

Based on the total compositions, mortar compositions, which can be measured out, have approximately the following composition in percent by weight:

| a) | vinyl ester urethane resin | 9 to 65, preferably 16 to 32 |
|---|---|---|
|  | reactive diluents | 0 to 30, preferably 8 to 22 |
|  | accelerators | 0 to 1.5, preferably 0.01 to 1 |
|  | stabilizers (plasticizers) | 0 to 10, preferably 0.5 to 7 |
|  | mineral fillers | 15 to 85, preferably 45 to 65 |
|  | thixotropizing agents | 0 to 5, preferably 0.5 to 4 |
| b) | organic peroxides | 0.2 to 5, preferably 0.5 to 4 |

EMBODIMENTS

Example 1 a) Mortars, which can be measured out, for anchoring threaded rods in solid masonry (bricks)

| | |
|---|---|
| Vinyl ester urethane resin based on novolak, methacrylic acid and diisocyanatodiphenylmethane | 20.45% |
| monostyrene | 11.50% |
| diethylaniline | 0.11% |
| chloroparaffin (C10–C13, 49% chlorine) | 4.26% |
| pyrogenic silica, subjected to an organic aftertreatment | 1.26% |
| siliceous earth, 44 . . . 200 microns (68% christobalite, 31% kaolinite, subsequently treated with distearyldimethylammonium chloride) | 12.69% |
| b) quartz sand 0.1 . . . 0.25 mm | 46.80% |
| hollow glass spheres | 1.75% |
| dibenzoyl peroxide | 1.18% |
| | 100.00% |

Example 2 a) Vinyl ester urethane mortar, which can be measured out, for fastening smooth, epoxy-coated steel rods (smooth dowel bars)

| | |
|---|---|
| vinyl ester urethane resin based on bisphenol A, methacrylic acid and hexane diisocyanate | 21.29% |
| monostyrene | 15.79% |
| diethylaniline | 0.18% |
| pyrogenic silica, subjected to an organic aftertreatment | 2.66% |
| quartz sand, 50–100 microns | 3.66% |
| quartz sand, 100–250 microns | 48.80% |
| b) paraffin (melting point of 46°–48° C.) | 0.18% |
| di-2-ethylhexyl phthalate | 3.72% |
| dibenzoyl peroxide | 3.72% |
| | 100.00% |

Example 3 a) Vinyl ester urethane mortar for fastening threaded rods in solid masonry (bricks)

| | |
|---|---|
| vinyl ester urethane resin based on bisphenol A, acrylic acid and toluylene diisocyanate | 32.0% |
| monostyrene | 13.72% |
| diethylaniline | 0.18% |
| chloroparaffin (C10–C13, 49% chlorine content) | 1.42% |
| pyrogenic silica, subjected to an organic aftertreatment | 1.16% |
| quartz powder, 0–63 microns | 9.17% |
| quartz sand, 100–250 microns | 35.68% |
| b) hollow glass spheres | 1.83% |
| di-2-ethylhexyl phthalate | 2.42% |

|  | |
|---|---|
| dibenzoyl peroxide | 2.42% |
|  | 100.00% |

Example 4 a) Vinyl ester urethane mortar, which can be measured out, for fastening threaded rods and reinforcing iron in concrete and rock

|  | |
|---|---|
| vinyl ester urethane resin based on novolak, methacrylic acid and diisocyanatodiphenylmethane | 9.85% |
| vinyl ester urethane resin based on bisphenol A, methacrylic acid and diisocyanatodiphenyl methane | 7.63% |
| monostyrene | 12.10% |
| divinylbenzene | 4.04% |
| dimethylaniline | 0.04% |
| pyrogenic silica, subjected to an organic aftertreatment | 0.62% |
| quartz powder, 0–63 microns | 14.04% |
| quartz sand, 50–150 microns | 15.23% |
| quartz sand, 100–250 microns | 35.73% |
| b) paraffin with a melting point of 46°–48° C. | 0.12% |
| di-2-diethylhexyl phthalate | 0.08% |
| dibenzoyl peroxide | 0.52% |
|  | 100.00% |

Example 5 a) Vinyl ester urethane mortar for fastening threaded rods in concrete and solid bricks

|  | |
|---|---|
| vinyl ester urethane resin based on bisphenol A, methacrylic acid and diisocyanatodiphenylmethane | 26.79% |
| monostyrene | 21.41% |
| diethylaniline | 0.31% |
| chloroparaffin (C10–C13) 49% chlorine) | 3.01% |
| siliceous earth, 44 . . . 200 microns (68% christobalite, 31% kaolinite, given an aftertreatment with distearyldimethylammonium chloride) | 22.03% |
| pyrogenic silica, subjected to an organic aftertreatment | 0.52% |
| b) hollow glass spheres | 23.01% |
| dibenzoyl peroxide | 2.92% |
|  | 100.00% |

Cartridges

Mixtures, which contain, aside from other components, the following 3 components in the proportions given below, based on the total composition, have proven to be particularly advantageous:

|  | |
|---|---|
| vinyl ester urethane resin | 9–28% by weight |
| reactive diluent | 4–16% by weight |
| fillers | 56–82% by weight |

|  | Dimension M12 |
|---|---|

Example 6 a) External Cartridge

|  | |
|---|---|
| weight of the glass | 5.6 g |
| external diameter of glass | 10.75 mm |
| glass wall thickness | 0.55 mm |
| cartridge length | 100 mm |
| vinyl ester urethane resin based on bisphenol A, methacrylic acid and diisocyanatodiphenylmethane (65% in monostyrene) pre-accelerated with amine | 4.3 g |
| Quartz (particle size: 1.5–2.0 mm) | 6.6 g | b) Internal Cartridge

|  | |
|---|---|
| weight of the glass | 1.2 g |
| external diameter of glass | 6.3 mm |
| glass wall thickness | 0.65 mm |
| cartridge length | 80 mm |
| dibenzoyl peroxide (20% in plaster) | 0.8 g |

Example 7 a) External Cartridge

|  | |
|---|---|
| weight of the glass | 5.8 g |
| external diameter of glass | 10.75 mm |
| glass wall thickness | 0.45 mm |
| cartridge length | 110 mm |
| 40 parts by weight: vinyl ester urethane resin based on bisphenol A, acrylic acid and diisocyanato-diphenylmethane (55% in monostyrene); 5 parts by weight: divinylbenzene, accelerated with dimethyl-p-toluidine (0.15%) | 3.8 g | b) Internal Cartridge

|  | |
|---|---|
| weight of the glass | 2.2 g |
| external diameter of glass | 9.20 mm |
| glass wall thickness | 0.45 mm |
| cartridge length | 90 mm |
| quartz (1.2–1.8 mm) | 5.4 g |
| dibenzoyl peroxide (20% in phthalate) | 0.8 g |

Example 8 a) External Cartridge

|  | |
|---|---|
| weight of the glass | 5.8 g |
| external diameter of glass | 10.75 mm |
| glass wall thickness | 0.45 mm |
| cartridge length | 110 mm |
| vinyl ester urethane resin based on bisphenol A, methacrylic acid and toluylene diisocyanate, 80% in methacrylate ester, preaccelerated with amine | 4.2 g | b) Internal Cartridge

|  | |
|---|---|
| weight of the glass | 2.2 g |
| external diameter of glass | 9.20 mm |
| glass wall thickness | 0.45 mm |
| cartridge length | 90 mm |
| quartz (0.04–0.15 mm) | 0.4 g |
| quartz (1.2–1.8 mm) | 5.0 g |
| dibenzoyl peroxide (50% in chalk) | 0.5 g |

Example 9 a) External Cartridge

|  | |
|---|---|
| weight of the glass | 5.6 g |
| external diameter of glass | 10.75 mm |
| glass wall thickness | 0.45 mm |
| cartridge length | 100 mm |
| vinyl ester urethane resin based on bisphenol A, methacrylic acid and diisocyanatodiphenylmethane (75% in monostyrene) | 3.0 g |
| vinyl ester urethane resin based on novolak, methacrylic acid and diisocyanatodiphenylmethane (60% in monostyrene) | 1.2 g |
| cobalt octoate | 0.001 g |
| dimethylaniline | 0.004 g | b) Internal Cartridge

-continued

|  | Dimension M12 |
| --- | --- |
| weight of the glass | 0.7 g |
| external diameter of glass | 43 mm |
| glass wall thickness | 0.65 mm |
| cartridge length | 80 mm |
| methyl ethyl ketone peroxide | 0.35 g |

We claim:

1. A method for fastening an anchor rod in a bore hole comprising placing a curable component for fastening an anchor rod in bore holes containing a curable component comprising in percent by weight about:

vinyl ester urethane resin 9 to 65, obtained from toluene diisocynate or diisocyanatodiphenyl methane,

| reactive diluent | 11.5 to 30, |
| --- | --- |
| accelerator | 0.03 to 1.5, |
| mineral filler | 15 to 85, |
| thixotropic agent | 0 to 5 | and the curing agent comprising in percent by weight about:

organic peroxide 0.2 to 5, in the bore hole and introducing the anchor rod to said bore hole so as to mix the curable component with the curing agent.

2. A method for fastening an anchor rod in a borehole comprising placing a 2-chamber cartridge in the borehole, the cartridge separately containing a curable component and a curing agent, the curable component comprising in percent by weight about:

vinyl ester urethane resin 9 to 65, obtained from toluene diisocynate or diisocyanatodiphenyl methane,

| reactive diluent | 11.5 to 30, |
| --- | --- |
| accelerator | 0.03 to 1.5, |
| mineral filler | 15 to 85, |
| thixotropic agent | 0 to 5 | and the curing agent comprising in percent by weight about:

organic peroxide 0.2 to 5, and introducing the anchor rod to said bore hole so as to mix the curable component with the curing agent.

* * * * *